Jan. 2, 1934.   R. J. PAGE   1,941,575
TEMPLE HINGE OR MOUNTING FOR SPECTACLES
Filed Sept. 8, 1931
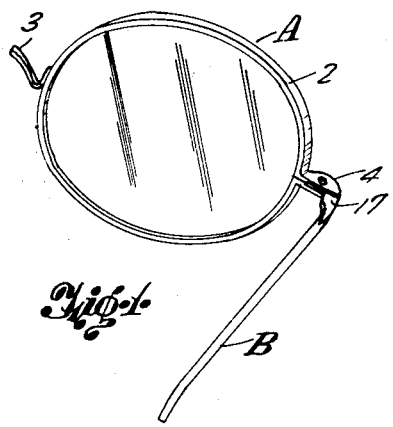
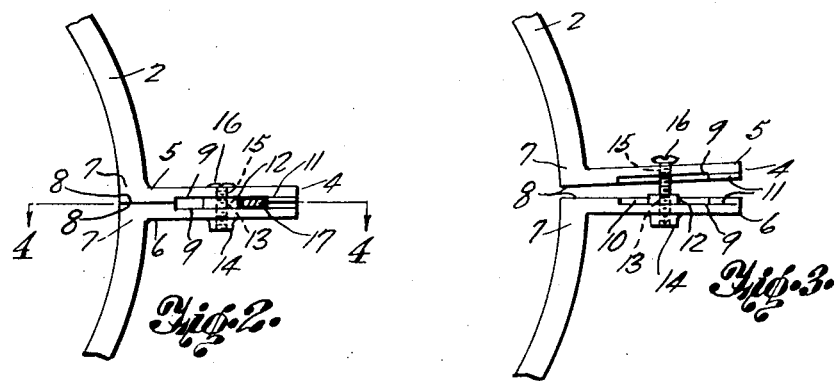
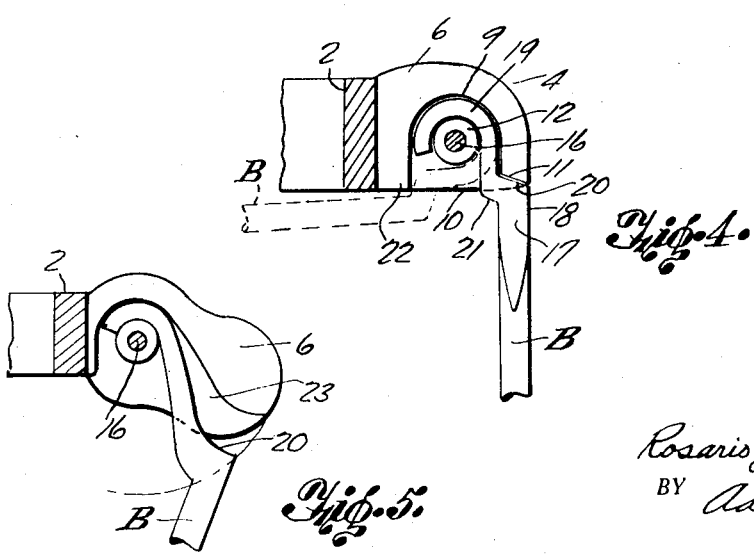
INVENTOR:
Rosario J. Page
BY Adam E. Fisher
ATTORNEY Patented Jan. 2, 1934

1,941,575

UNITED STATES PATENT OFFICE 1,941,575

TEMPLE HINGE OR MOUNTING FOR SPECTACLES

Rosario J. Page, Fort Kent, Maine

Application September 8, 1931. Serial No. 561,548

3 Claims. (Cl. 88—53)

This invention relates to improvements in temple hinges or mountings for spectacles.

The main object of the invention is to provide a novel and efficient hinged connection between an end piece of a spectacle frame and the end of a temple and which connection is so arranged that the usual swinging movement of the temple in folding and unfolding the same is positively and correctly limited to the proper degree by stops provided in the connection and operating independently of the actual hinged connection between the temple and end piece whereby that connection will be relieved of strain and will maintain its adjustment in use.

Another object is to provide a temple mounting or connection of the above character in which the end of the temple is bent and curled inwardly at its point of connection to the end piece of the spectacle frame whereby the remainder of the temple is offset laterally from the spectacle frame a considerable distance providing the necessary "cheek or temple clearance" and allowing the temple to clear the cheek or temple of the wearer in the most natural manner and without requiring that the temple be bent.

Another object is to provide a temple mounting or connection of this kind in which the clamping screw for the spectacle frame end piece is threaded into an elongated bearing in such manner that the said end piece may be loosened sufficiently to permit the removal or replacement of the temple without entirely removing the said screw. Inasmuch as these clamping screws are usually extremely small and are easily lost when removed from the spectacle frame, the above structure obviously is of considerable advantage and will greatly facilitate the work of repairing and replacing temples or lenses. The structure here provided also permits the use of a much larger screw, if desired.

Another object is to provide a temple mounting or connection of this kind which includes an end piece formed on the spectacle frame, the connection itself being formed of two angularly outstanding and complementary sections with registering recesses in their inner faces, thereby forming a sort of reinforcing slideway adapted to receive the flattened end and heel of the temple, which end is inset and curled inwardly to pivotally engage a bearing integrally formed on one section of the end piece and threaded to receive the clamping screw, the arrangement being such that the temple may swing freely through a certain arc in the process of being folded or unfolded, the extent of the arc being limited by heels or shoulders formed on the said temple and adapted to abut against stops formed on the said end piece on the spectacle frame.

A further object is to provide a mounting of the kind described in a simple, neat, efficient, strong and durable form, and which will not easily break at the point of connection of temple and lens or frame end piece.

With these and other objects in view, the invention resides in the novel construction and arrangement of parts as hereinafter fully set forth and claimed, reference being had to the accompanying drawing wherein Figure 1 is a perspective view of a portion of a spectacle frame and temple showing my improved mounting applied thereto;

Figure 2 is an enlarged rear elevation of a portion of the spectacle frame showing the end piece and temple, the latter being shown in cross section;

Figure 3 is a view similar to Figure 2 but showing the end piece opened and the temple detached;

Figure 4 is a horizontal section along line 4—4 in Figure 2, showing the temple in both its folded and unfolded positions, the former position being indicated in dotted lines;

Figure 5 is a horizontal section of another preferred form of hinge joint, showing the formation of an angularly disposed case or slideway for receiving the outer heel of the temple when opened.

Referring now more particularly to the drawing and to Figures 1 to 4 as exemplifying one preferred embodiment of the invention, the reference character A designates the spectacle frame and B the temple, the former being conventionally formed of two lens rims, one of which is shown at 2 and which are connected by the nose piece or bridge 3. In accordance with my invention, the end piece 4 of the rim 2 comprises an upper section 5 and lower section 6 radially extended from the parted ends 7 of the said rim and adapted to normally spread or stand apart as noted in Figure 3. The adjacent and inner faces 8 of said upper and lower sections 5 and 6 are provided with mating or registering recesses 9, the outer contour or margins of which are substantially U-shaped in plan as shown. The recesses 9 open outwardly along the rear margins of the upper and lower end piece sections 5 and 6 as designated at 10, and the extreme outer ends of the said sections adjacent the said opening or mouth 10 are cut to provide an angularly set stop or abutment 11 for a purpose to be described. A bearing collar or cylinder 12 is secured to or integrally formed with the lower end piece section 6 and is disposed within the recess 9 therein, the vertical height or length of said bearing being equal to or slightly less than the total depth of the opening formed by the two recesses 9 as shown in Figures 2 and 3. The bearing collar 12 is provided with a vertically extended and centrally located threaded bore 13 which passes through said collar, through the lower end piece section 6 and through a boss or extension 14 of the cylinder 12 disposed beneath said section 6. The total axial length of the threaded bore 13 is thus considerably greater than would be the case if the lower end piece section 6 alone were threaded. The upper end piece section 5 is provided with an aperture 15 adapted to register with the bore 13 and the clamping screw 16 is passed through this aperture 15 and threaded in said bore 13 to draw the two end piece sections 5 and 6 together.

The temple B has its butt or inner end 17 flattened, inset laterally at 18 to form a heel or shoulder 20, and formed into an inwardly curved hook 19. This hook 19 is adapted to fit freely around the bearing collar 12 and to lie in the recesses 9 in the end piece sections 5 and 6, whereby the temple is pivotally or hingedly connected to said end piece. It will be noted, however, that the hook 19 is given only a semi-circular curvature whereby it may be readily detached from the bearing collar 12 in a manner readily understood. When disposed in the recesses 9 as aforesaid, the hook 19 is held in operative, pivotal engagement with said bearing collar 12 by the margins of said recesses which are curved to follow closely the curvature of the hook as best shown in Figure 4.

In use the hook 19 is engaged with the bearing collar 12 by first loosening the clamping screw 16 so that the end piece sections 5 and 6 spread apart as shown in Figure 3 a sufficient distance to allow the insertion of the flattened end 17 of the temple B therebetween. The screw 16 is then again drawn tight and the two end piece sections 5 and 6 are drawn together locking the temple B in place but permitting the swinging of the same through a horizontal plane as necessary in folding or unfolding the temple in usual manner. To remove the temple, the process above is simply reversed. Due to the elongated character of the threaded bore 13 and the clamping screw 16, this screw need not be entirely withdrawn or unscrewed from the bore 13 in order to allow the insertion or removal of the hooked end 19 of the temple, thus preventing loss of this screw and facilitating the work as will be apparent. Due to the structural features described, a screw substantially larger than conventionally employed, may also be used, if desired. As the temple B is swung outwardly or unfolded, the outer heel or shoulder 20 formed at the laterally inset portion 18 of the temple, will abut against the stop 11 and act as an abutment for the temple. Similarly the inner shoulder 21 formed in like manner at the laterally inset portion 18 of the temple, will abut against the inner margin or abutment 22 adjacent the mouth of the opening formed by the recesses 9, and so will limit the inward swinging or folding action of the temple. This action is clearly shown in Figure 4, and it is understood that the same forms an effective and positive stop for the temple and at the same time relieves the bearing collar 12 and hooked end 19 of the temple of any strain and forms a more durable and efficient connection. Inasmuch as the flattened end 17 of the temple B is inset and curved inwardly, the main body portion of the temple is thus disposed further outward from the spectacle frame and will clear the cheeks or temples of the wearer as will be understood.

Further advantages of the invention will be apparent to those skilled in the art. In the case of rimless spectacles, a similar arrangement may be used, but to remove or replace the temple, it will be necessary to remove the clamping screw due to the fact that the two end piece sections 5 and 6 could not in this case be spread apart. The bearing collar 12 and boss 14 would not then be necessary and the hook 19 at the end of the temple B could be circular or ring-like.

In the modification shown in Figure 5, the recessed sections 5 and 6 are elongated angularly, laterally and rearwardly, thereby providing a sort of slideway 23, elongated outwardly from the screw 16, and adapted to slidably receive the complementarily formed temple end, including the heel 20, the whole constituting a very neat, strong and symmetrical joint, the angular disposition of which also affords a natural cheek clearance. This joint cannot become loose or wobbly, nor easily break off, owing to the substantial area of the temple end and of the upper and lower supporting sections 5 and 6, which firmly support the temple end. Likewise all strain being removed from the screw itself, the screw will not work loose nor break.

While I have herein set forth a certain preferred embodiment of my invention, it is understood that I may vary from the same in minor details, so as best to construct a practical device for the purposes intended, not departing from the spirit of the invention and within the scope of the appended claims.

I claim:

1. In a device of the kind described, in combination with a parted lens rim and a temple, an end piece including upper and lower sections extended from the parted ends of the lens frame, the said sections having registering recesses open at the rear margins of said end piece sections, abutments formed at each side opening of said recesses, a bearing collar on the lower section and within the recesses therein, a boss formed on the lower side of the lower section beneath the said bearing collar, the said bearing collar, lower section and boss having a central threaded bore, the upper section having a registering bore, a clamping screw passed through the said aligned bores and threaded in the said lower bore, the said temple being flattened adjacent its end and inset laterally forming shoulders adapted to engage the said abutments, the extremity of the temple forming an inwardly curved semi-circular hook adapted to engage said bearing collar.

2. In a device of the kind described, in combination with a temple and a parted lens rim including an end piece, the said end piece comprising upper and lower sections having registering recesses in their adjacent inner faces, the said recesses opening out rearwardly, a bearing collar formed on the lower section in the recess therein, a boss formed on the said lower section beneath the said bearing collar, the said collar and boss having a threaded bore, the upper section having an aperture, a clamping screw passed through the said aperture and threaded into the threaded bore, an inwardly curved semi-circular hook on the end of the temple adapted to rotatably engage the said bearing collar, and shoulders formed on the said temple and adapted to engage the rear margins of the upper and lower end piece sections.

3. In a device of the kind described, the combination with a parted lens rim, of a complemental pair of elongated end piece sections extended in registry angularly outward and rearward, one each from the parted portions of the rim, the same being recessed in registry upon their inner contiguous faces to form an elongated slideway opening out rearwardly and at the outer end, a pivot screw passed through the inner ends of the assembly, a temple flattened at its inner end and bent complementarily to the marginal contour of the slideway, and a semi-circular hook at the inner extremity of the temple engaging the said pivot screw.

ROSARIO J. PAGE.